US012667838B2

(12) United States Patent
Mu et al.

(10) Patent No.: US 12,667,838 B2
(45) Date of Patent: Jun. 30, 2026

(54) MICROFLUIDIC FLOW CHANNEL STRUCTURE AND MICROFLUIDIC CHIP

(71) Applicant: BOE Technology Group Co., Ltd., Beijing (CN)

(72) Inventors: Yunqing Mu, Beijing (CN); Dandan Chen, Beijing (CN); Ding Ding, Beijing (CN)

(73) Assignee: BOE Technology Group Co Ltd, Beijing (CN)

( * ) Notice: Subject to any disclaimer, the term of this patent is extended or adjusted under 35 U.S.C. 154(b) by 772 days.

(21) Appl. No.: 18/016,359

(22) PCT Filed: Feb. 18, 2022

(86) PCT No.: PCT/CN2022/076863
§ 371 (c)(1),
(2) Date: Jan. 16, 2023

(87) PCT Pub. No.: WO2023/155142
PCT Pub. Date: Aug. 24, 2023

(65) Prior Publication Data

US 2024/0246074 A1 Jul. 25, 2024

(51) Int. Cl.
*B01L 3/00* (2006.01)

(52) U.S. Cl.
CPC . *B01L 3/502715* (2013.01); *B01L 2300/0816* (2013.01); *B01L 2300/0858* (2013.01); *B01L 2300/087* (2013.01); *B01L 2300/088* (2013.01); *B01L 2400/086* (2013.01)

(58) Field of Classification Search
None
See application file for complete search history.

(56) References Cited

U.S. PATENT DOCUMENTS

2004/0262223 A1 12/2004 Strook et al.

FOREIGN PATENT DOCUMENTS

| | | | | |
|---|---|---|---|---|
| CN | 106492718 A | 3/2017 | | |
| CN | 106492719 A | 3/2017 | | |
| CN | 105424922 B | 1/2018 | | |
| CN | 110628567 A | 12/2019 | | |
| CN | 110653012 A | 1/2020 | | |
| CN | 110813393 A | 2/2020 | | |
| CN | 211043091 U | 7/2020 | | |
| CN | 113198403 A | * 8/2021 | ............ | B01F 33/821 |
| CN | 113786869 A | 12/2021 | | |

* cited by examiner

*Primary Examiner* — Matthew D Krcha

(57) ABSTRACT

A microfluidic flow channel structure and a microfluidic chip are described. The microfluidic flow channel structure includes a main chamber, wherein the main chamber includes at least two division zones and a reaction zone, and the at least two division zones are respectively connected with the reaction zone, wherein each division zone includes a first division wall, and the first division wall is provided with an opening for liquid inlet; a diversion structure is arranged at the opening of at least one division zone, and the diversion structure at least includes a first diversion wall, which is arranged opposite the first division wall; a first division channel is formed between the first diversion wall and the first division wall, and the first division channel includes at least two liquid outlets.

19 Claims, 11 Drawing Sheets

MICROFLUIDIC FLOW CHANNEL STRUCTURE AND MICROFLUIDIC CHIP

CROSS-REFERENCE TO RELATED APPLICATION

This application is a national stage application of PCT Application No. PCT/CN2022/076863, which is filed on Feb. 18, 2022 and entitled "Microfluidic Flow Channel Structure and Microfluidic Chip", the content of which should be regarded as being incorporated herein by reference.

TECHNICAL FIELD

The disclosed embodiment relates to, but is not limited to, the technical field of microfluidics, in particular to a microfluidic flow channel structure and a microfluidic chip.

BACKGROUND

Microfluidic Chip is an important science and technology in this century. The cover article of Business 2.0 USA magazine has listed microfluidic chip as one of the seven technologies that changed the world. It can build a chemical or biological laboratory on a chip of several square centimeters. It integrates various reactions and processes involved in the fields of biology and chemistry, and realizes various desired functions with controllable fluid through a network of micro-channels on the chip.

Due to the micro-structure characteristics of microfluidic chips, they are prone to problems such as uneven distribution of samples and retention of samples in the process of liquid inlet, which affects the sample utilization and the accuracy and precision of detection.

SUMMARY

The following is a summary of subject matters described herein in detail. The summary is not intended to limit the protection scope of claims.

The disclosed embodiment provides a microfluidic flow channel structure, which includes a main chamber, wherein the main chamber includes at least two division zones and a reaction zone, and the at least two division zones are respectively connected with the reaction zone.

Each division zone includes a first division wall, and the first division wall is provided with an opening for liquid inlet.

A diversion structure is arranged at the opening of at least one division zone, and the diversion structure at least includes a first diversion wall, which is arranged opposite the first division wall; a first division channel is formed between the first diversion wall and the first division wall; the opening serves as a liquid inlet of the first division channel, and the first division channel includes at least two liquid outlets.

The disclosed embodiment provides a microfluidic chip including the flow channel structure described above.

Of course, an implementation of any product or method in the embodiments of the present disclosure does not need to achieve all the advantages mentioned above at the same time. Other features and advantages of the present disclosure will be described in subsequent embodiments in the description, and, in part, become apparent from the embodiments in the description, or can be understood by implementing the embodiments of the present disclosure. Purposes and other advantages of the technical solutions of the present disclosure may be achieved and acquired by structures specified in the detailed description, claims and drawings.

Other aspects may be understood upon reading and understanding the drawings and the detailed description.

BRIEF DESCRIPTION OF DRAWINGS

The drawings are intended to provide a further understanding of technical solutions of the present disclosure and form a part of the specification, and are used to explain the technical solutions of the present disclosure together with embodiments of the present disclosure, and not intended to form limitations on the technical solutions of the present disclosure. Shapes and sizes of various components in the drawings do not reflect actual scales, and are only intended to schematically illustrate the contents of the present disclosure.

DETAILED DESCRIPTION

Figure 1:
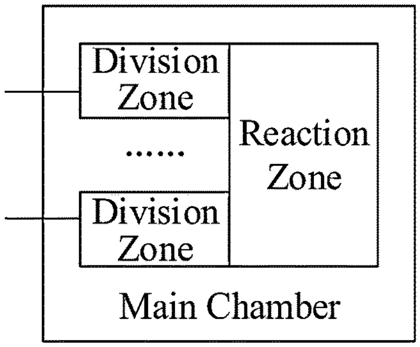
FIG. 1 is a schematic diagram of a microfluidic flow channel structure provided by an embodiment of the present disclosure.

Following embodiments serve to illustrate the present disclosure, but are not intended to limit the scope of the present disclosure. It is to be noted that the embodiments in the present disclosure and features in the embodiments may be randomly combined with each other if there is no conflict.

The ‘thickness’ involved in the microfluidic flow channel structure provided in the disclosed embodiment refers to the dimension in the direction perpendicular to the upper and lower substrate planes (or the upper and lower side surfaces of the flat chip). In the disclosed embodiment, the ‘length direction’ of a part of a structure refers to the direction in which the liquid body is heading, and the ‘ length’ of a part of a structure refers to the size of the part of the structure along the direction in which the liquid body is heading. Accordingly, the ‘width direction’ refers to the direction perpendicular to the direction in which the liquid body is heading, and the ‘width’ of a part of a structure refers to the size of the part of the structure along the direction perpendicular to the direction in which the liquid body is heading.

Chip immunoassay technology is a new concept of bioassay technology which combines the specificity of antigen-antibody binding reaction with the principle of high-density integration of electronic chips. It is an advanced detection method which arranges several, dozens, even tens of thousands or higher antigens (or antibodies) together in high density to make a chip, and reacts with the patient’s sample to be detected and biological specimen at the same time, which can obtain the detection results of all known antigens (or antibodies) in the chip at one time and obtain biological information with the advantages of high throughput, rapidity, easy operation and high degree of automation. According to different carriers, the chip can be categorized as: flat chip, microsphere chip and liquid chip. According to different experimental principles, the chip can be categorized as: double antibody sandwich immune chip, indirect immune chip, competition immune chip and immune-PCR chip. According to different detection methods, the chip can be categorized as enzyme-labeled immune chip, radioisotope immune chip, fluorescent immune chip and gold-labeled immune chip.

One of the commonly used immunodetection methods is the double antibody sandwich immune chip method. The fluorescent immunoassay chip developed for this purpose is a protein chip constructed by using the specificity, i.e., immunoreactivity of antibody-antigen binding. The capture protein and the detection protein are respectively pre-embedded on the chip to form a microarray of protein, enabling multiplexed detection of markers. The marker can be detected with the help of fluorescence detection system, which requires only one imaging, and the software can automatically analyze and print the results. Small and portable design makes it have a very wide range of application scenarios.

In the related technology, the basic reaction flow of the double antibody sandwich immune chip method is as follows: firstly, the sample to be detected is fed from the sample inlet, passes through the first mixing zone, then enters the first reaction zone, and it will react with the lyophilized fluorescent antibody pre-embedded in the glass module corresponding to the first reaction zone, so that the antibody is redissolved, and the antigen and antibody are specifically combined. Afterwards, after passing through the second mixing zone, the antigen in the sample fully reacts with the fluorescent antibody. When the antigen-antibody pair reaches the second reaction zone, it reacts with the capture antibody grafted on the glass module corresponding to the second reaction zone, forming a double antibody sandwich. After the reaction is completed, a buffer solution is pumped from the sample inlet of the chip, and reaction zone is rinsed to clean off the fluorescent antibody that has not been captured, and the waste solution flows into the waste pool. The chip is placed under a fluorescence microscope for optical signal detection, so as to determine the amount of antigen in the sample.

However, the main problem encountered in the implementation process is that the lyophilized antibody pre-embedded in the first reaction zone can’t be effectively redissolved, and most of the lyophilized antibody remains on the chip substrate, and doesn’t react with the antigen in time, which makes the detection efficiency and accuracy of the chip fail to meet the expected requirements, and in addition both samples and antibodies were not fully utilized, forming a waste.

Therefore, the embodiment of the present disclosure provides a microfluidic flow channel structure, as shown in FIG. 1, which includes a main chamber, wherein the main chamber includes at least two division zones and a reaction zone, and the at least two division zones are respectively connected with the reaction zone.

Each division zone includes a first division wall, and the first division wall is provided with an opening for liquid inlet.

A diversion structure is arranged at the opening of at least one division zone, and the diversion structure at least includes a first diversion wall, which is arranged opposite the first division wall; a first division channel is formed between the first diversion wall and the first division wall; the opening serves as a liquid inlet of the first division channel, and the first division channel includes at least two liquid outlets.

For example, the liquid inlet can be located at any position of the first division channel, and the position of the liquid inlet of the first division channel can be changed by setting the position of the first diversion wall. For example, the approximately middle position of the first diversion wall can be set to correspond to the opening of the first division wall while the liquid inlet of the first division channel is located at the middle of the first division channel, and the openings at both ends of the first division channel can be used as the liquid outlets of the first division channel.

Optionally, the first diversion wall can also be provided with an opening, and the opening in the first diversion wall can be used as a liquid outlet of the first division channel, so that the first division channel has more liquid outlets. More liquid outlets can form more velocity components.

The first division channel can divide one way liquid entering the division zone into at least two ways to form at least two velocity components. By setting a division zone in the main chamber and a diversion structure in at least one division zone, the velocity component of the sample liquid entering the reaction zone can be increased, and the flow disturbance and local shear in the reaction zone can be increased, which can better help the antibody to redissolve, increase the redissolving amount, and improve the accuracy and precision of detection.

Optionally, the first division wall can be arranged in parallel with the first diversion wall, i.e., the widths at different positions of the first division channel are approximately the same; or the first division wall and the first diversion wall may not be arranged in parallel. When they are not arranged in parallel, the distance between one side of the first diversion wall and the first division wall is smaller than the distance between the other side of the first diversion wall and the first division wall (the distance perpendicular to the liquid flow direction), i.e., the width of the first division channel gradually decreases or gradually increases along the liquid flow direction.

In the plane parallel to the microfluidic flow channel structure, the shape of the main control chamber can be circular-like or polygonal.

In an exemplary embodiment, the at least one division zone may further include a second division wall, one end of the first division wall is connected with the second division wall, and the diversion structure may further include a second diversion wall, one end of the first diversion wall is connected with the second diversion wall, and the second diversion wall is opposite the second division wall, and a second division channel is formed between the second diversion wall and the second division wall. The second division channel is communicated with the first division channel, for example, the second division channel is communicated with the first liquid outlet of the first division channel. The second division channel can act as an extension of the first division channel, and can continuously guide the incoming liquid to the required position.

In an exemplary embodiment, the division zone may further include a third division wall, one end of the first division wall away from the second division wall is connected with the third division wall, and the diversion structure further includes a third diversion wall, one end of the first diversion wall away from the second diversion wall is connected with the third diversion wall, and the third diversion wall is opposite the third division wall, and a third division channel is formed between the third diversion wall and the third division wall, the third division channel is communicated with the first division channel, for example, the third division channel is communicated with the second liquid outlet of the first division channel. The third division channel can also act as an extension of the first division channel, and can guide the liquid in the third division channel to the required position.

In an exemplary embodiment, in the plane parallel to the microfluidic flow channel structure, the first division wall is arcuate, linear or bending and the first diversion wall is arcuate, linear or bending. The shapes of the first division wall and the first diversion wall may be the same or different. For example, both the first division wall and the first diversion wall are arcuate, or both the first division wall and the first diversion wall are linear, or the first division wall is arcuate, the first diversion wall is linear, or the first division wall is linear, the first diversion wall is arcuate, and so on. When both the first division wall and the first diversion wall are arcuate, the resistance of liquid inlet can be reduced and the flow rate can be increased.

In an exemplary embodiment, in the plane parallel to the microfluidic flow channel structure, the second division wall is arcuate or a linear; the second diversion wall is arcuate or linear. The shapes of the second division wall and the second diversion wall may be the same or different. For example, both the second division wall and the second diversion wall are arcuate, or both the second division wall and the second diversion wall are linear, or the second division wall is arcuate, or the second diversion wall is linear and or the second division wall is linear, or the second diversion wall is arcuate. In the direction of liquid flow, the width of the second division channel may be constant, or gradually become smaller or larger. In other exemplary embodiments, the second division wall may be bending, and the second diversion wall may be bending.

In an exemplary embodiment, in the plane parallel to the microfluidic flow channel structure, the third division wall is arcuate or linear and the third diversion wall is arcuate or linear. The shapes of the third division wall and the third diversion wall may be the same or different. For example, the third division wall and the third diversion wall are both arcuate, or the third division wall and the third diversion wall are both linear, or the third division wall is arcuate, the third diversion wall is linear, or the third division wall is linear, the third diversion wall is arcuate. In the direction of liquid flow, the width of the third division channel may be constant, or gradually become smaller or larger. In other exemplary embodiments, the third division wall may be bending, and the third diversion wall may be bending.

Figure 2:
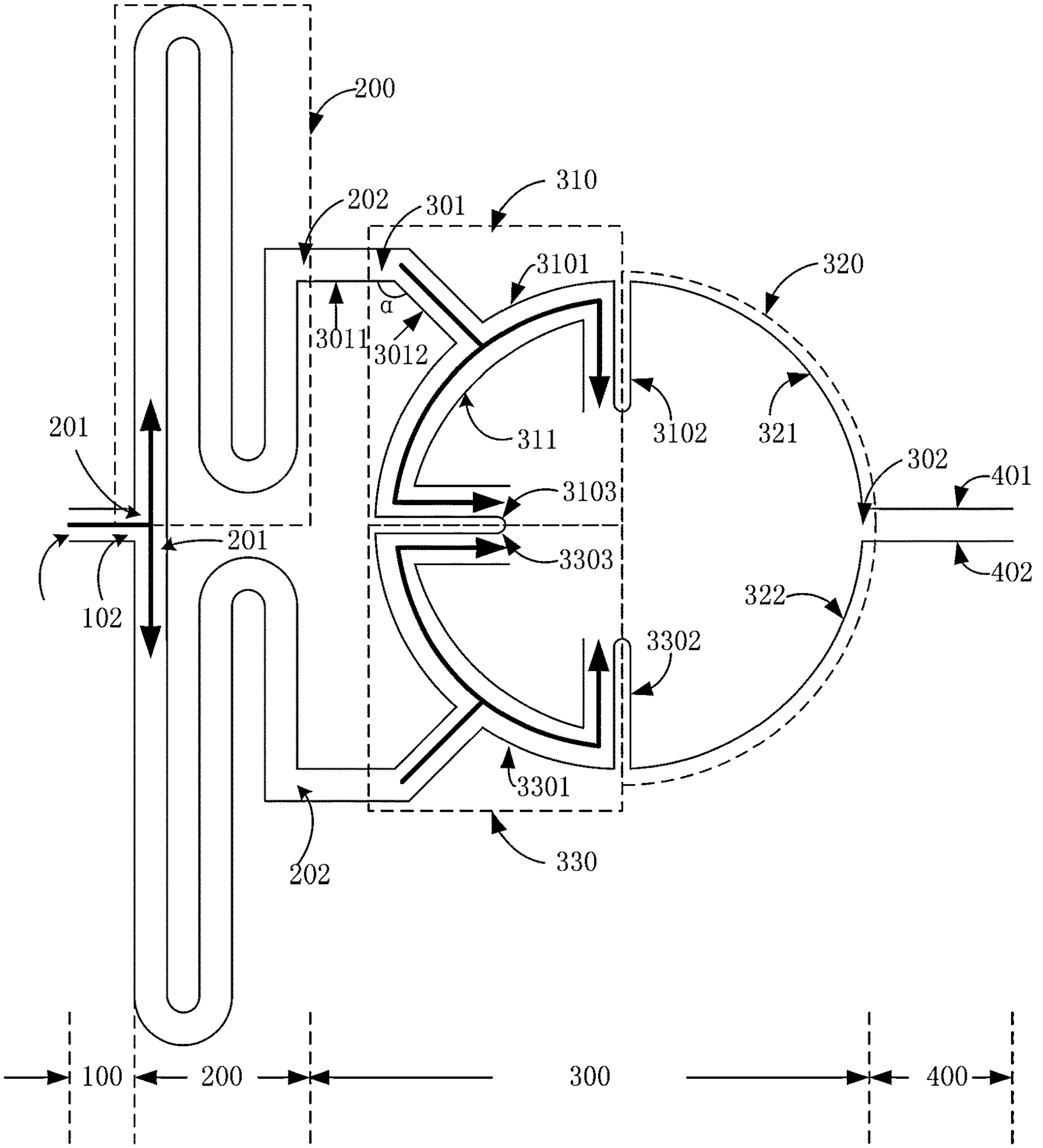
FIG. 2 is a schematic diagram of a microfluidic flow channel structure according to an embodiment of the present disclosure.

In an exemplary embodiment, the cross section of the second division wall is U-shaped in the plane parallel to the microfluidic flow channel structure (as shown in the embodiment of FIG. 2), and in other embodiments, the cross section of the second division wall may be other shapes, such as linear. The second division wall can be connected with the side wall of the reaction zone, one end of the U-shaped second division wall can be connected with the first division wall, and the other end can be connected with the side wall of the reaction zone (hereinafter referred to as the reaction wall).

In the case of the main chamber containing two division zones, for example, one end of the second division wall of the first division zone is connected to the first division wall of the same division zone, and the other end is connected to the reaction wall of the reaction zone. One end of the second division wall of the second division zone is connected with the first division wall of the same division zone, and the other end is connected with another reaction wall of the reaction zone. When the main chamber includes three or more division zones, a plurality of division zones can be arranged adjacent to each other and the connection between the outermost two division zones among the adjacent division zones and the reaction zone is the same as the first division zone and the second division zone.

In an exemplary embodiment, for any two adjacent division zones, wherein: the third division wall of the first division zone and the third division wall of the second division zone can share the same division wall structure, and the side of the division wall structure facing the first division zone serves as the third division wall of the first division zone, and the side of the division wall structure away from the first division zone, i.e., towards the second division zone serves as the third division wall of the second division zone.

For example, in the plane parallel to the microfluidic flow channel structure, the cross-sectional shape of the division wall structure is U-shape, with one side of the U-shaped structure serving as the third division wall of the first division zone, the end of which is connected with the first division wall of the first division zone, and the other side of the U-shaped structure serving as the third division wall of the second division zone, and the end of which is connected with the first division wall of the second division zone, as shown in the embodiment of FIGS. 2, 6, 7, 9 and 12 below.

Figure 10:
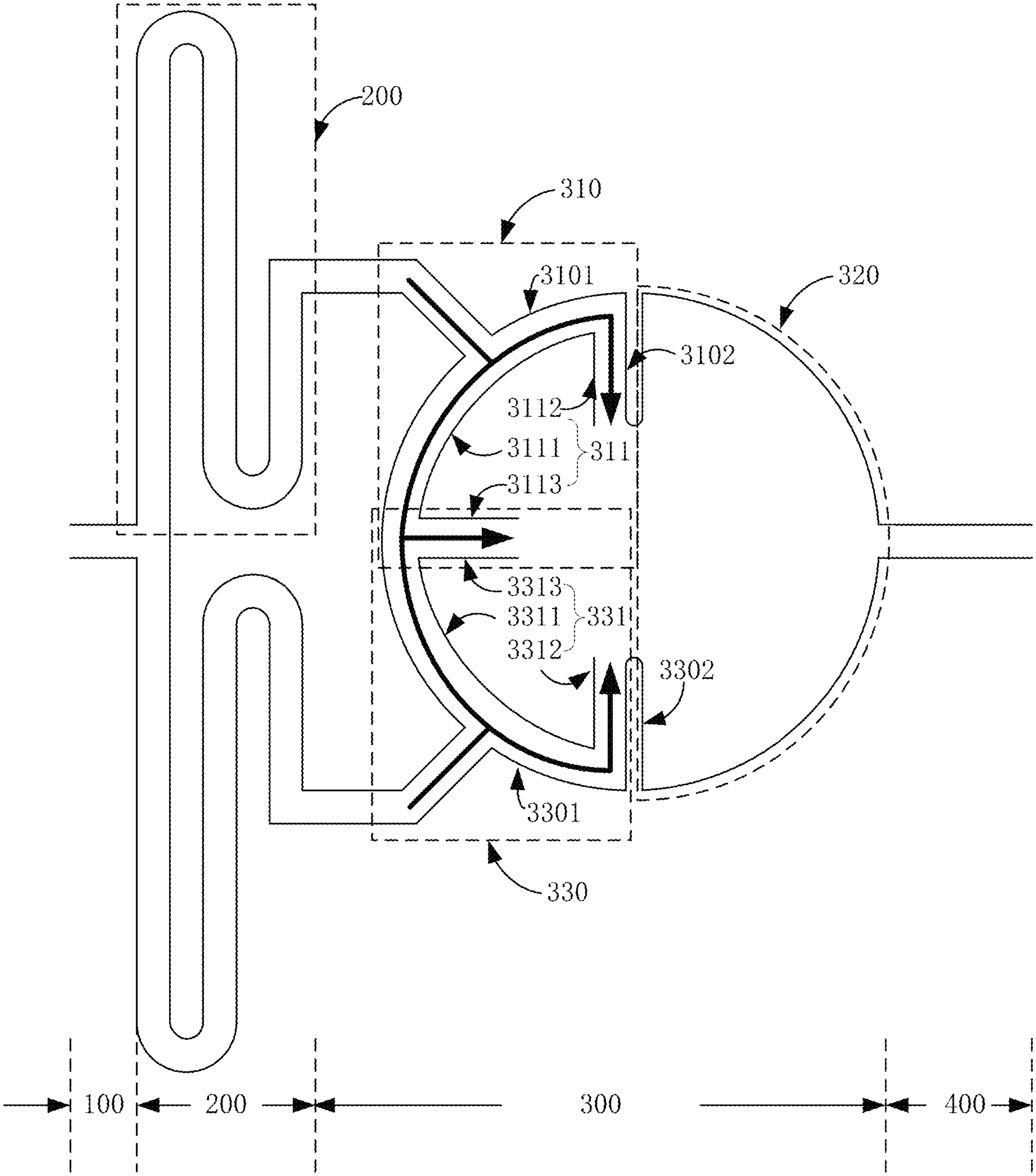
FIG. 10 is a schematic diagram of another microfluidic flow channel structure according to the embodiment of the present disclosure.
Figure 11:
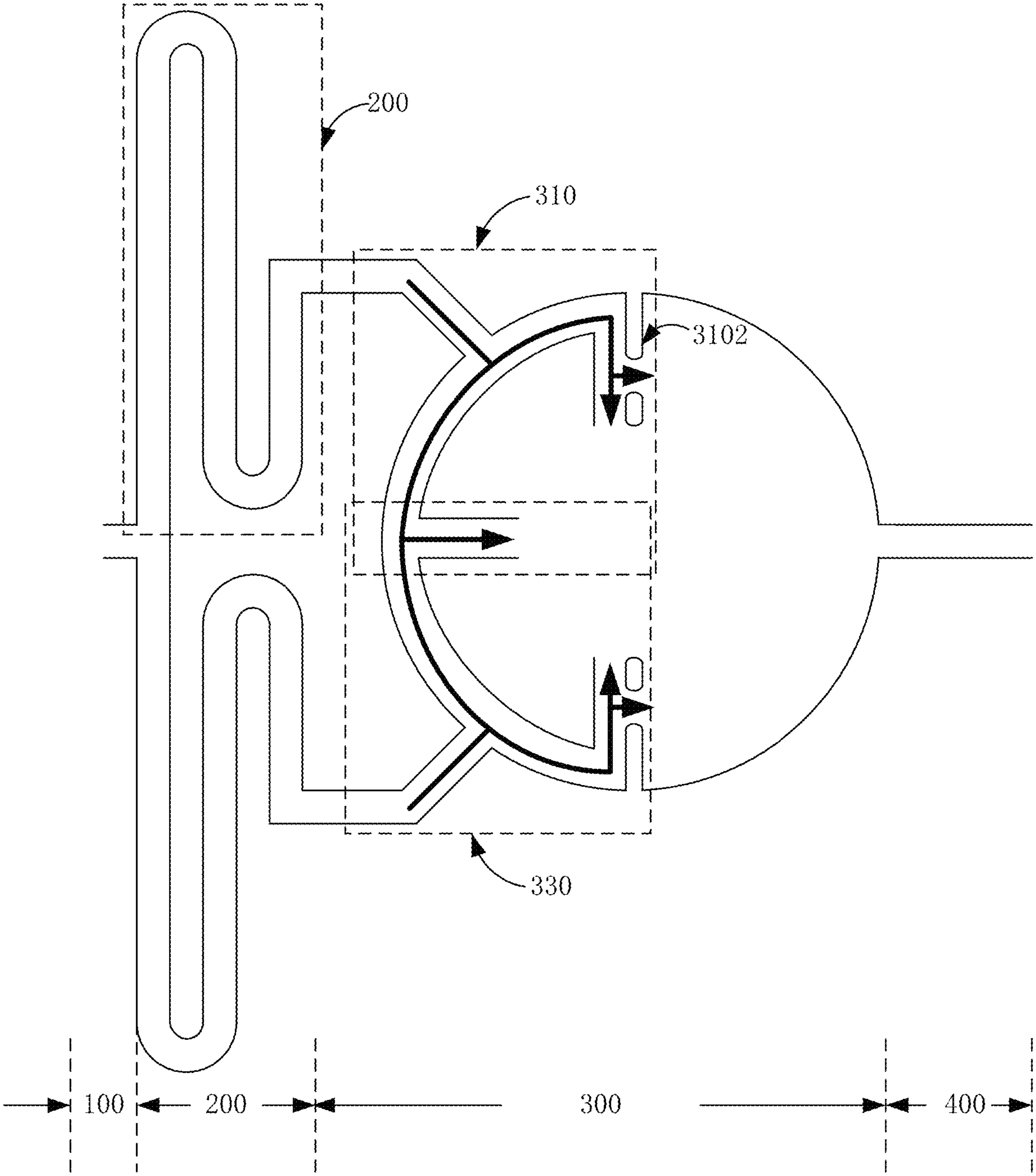
FIG. 11 is a schematic diagram of another microfluidic flow channel structure according to the embodiment of the present disclosure.

In the exemplary embodiment, two adjacent division zones may share a division channel. For example, for any two adjacent division zones: one end of a first division wall of the first division zone is connected to one end of a first division wall of the second division zone, the other end of the first division wall of the first division zone is connected to a second division wall of the first division zone, the other end of the first division wall of the second division zone is connected to a second division wall of the second division zone, a first division wall of the first division zone is connected to a first division wall of the second division zone; the diversion structure of at least two division zones further includes a third diversion wall, said first diversion wall being connected to said third diversion wall at one end away from said second diversion wall; a third division channel is formed between the third diversion wall of said first division zone and the third diversion wall of said second division zone, said third division channel is communicated with the first division channel of said first division zone, and with the first division channel of said second division zone. At this time, the first division zone and the second division zone share the third division channel, as shown in the embodiments of FIGS. 10 and 11 below.

Figure 12:
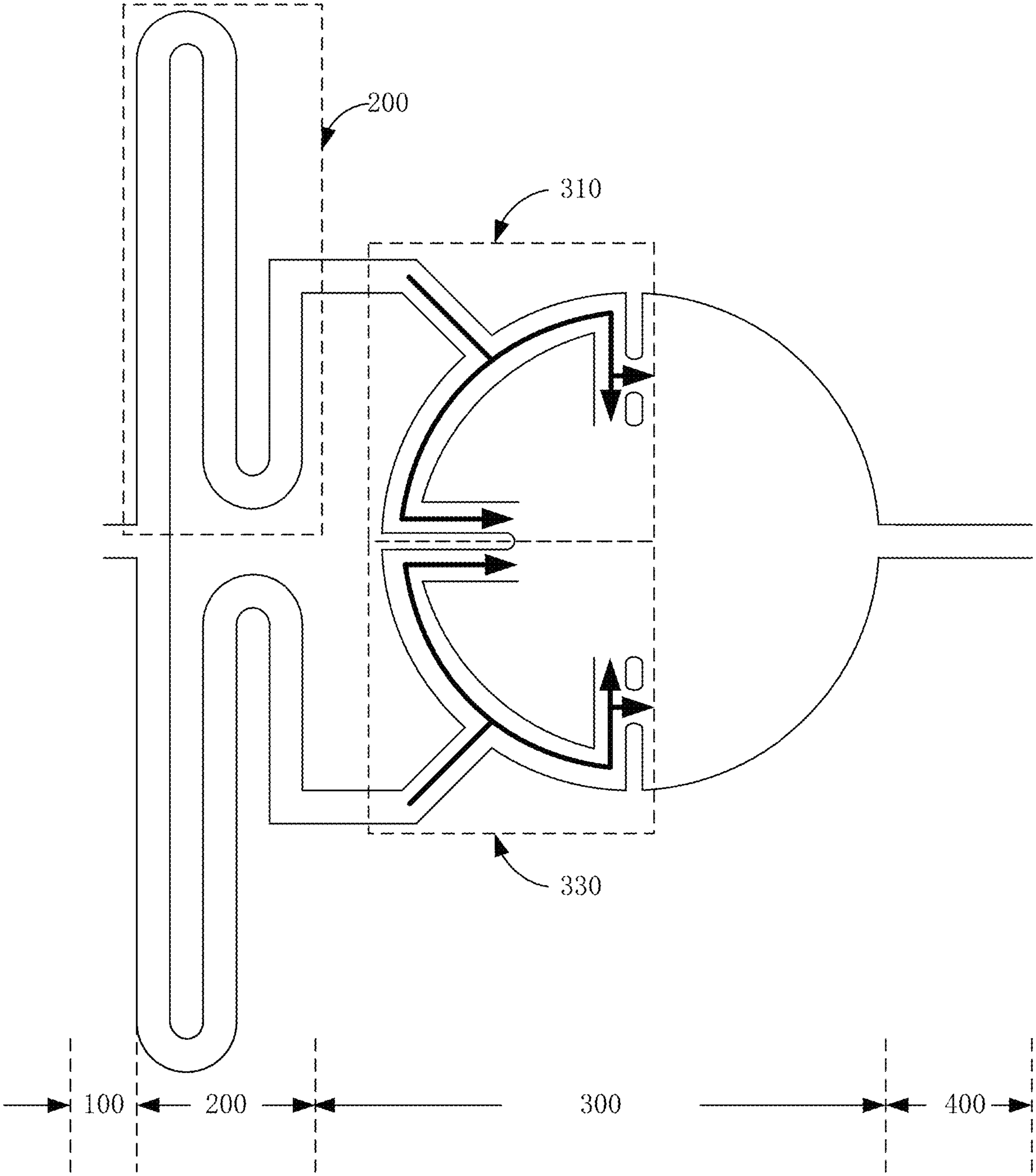
FIG. 12 is a schematic diagram of another microfluidic flow channel structure according to the embodiment of the present disclosure.

In an exemplary embodiment, the second division wall may be provided with an opening. This opening can be used to increase the velocity component, as shown in the embodiments of FIGS. 11 and 12 below.

In an exemplary embodiment, the reaction zone includes a first reaction wall and a second reaction wall. The first reaction wall and the second reaction wall are opposite each other, forming a reaction zone inlet, a reaction channel and a reaction zone outlet. From the reaction zone inlet to the reaction zone outlet, the width of the reaction zone channel gradually decreases. The first reaction wall, the second reaction wall, and the first division walls of different division zones can jointly form the outer contour of the main chamber.

In an exemplary embodiment, in the plane parallel to the microfluidic flow channel structure, the first reaction wall and the second reaction wall are arcuate, as in the embodiments shown in FIGS. 2, 7, 10, 11 and 12 below.

Optionally, in the plane parallel to the microfluidic flow channel structure, the first reaction wall and the second reaction wall are linear, as in the embodiment shown in FIG. 6 below. In other embodiments, the first reaction wall and the second reaction wall may be bending.

Optionally, in the plane parallel to the microfluidic flow channel structure, the first reaction wall includes at least two reaction wall sub-sections connected in sequence, wherein at least one reaction wall sub-section is arcuate and at least one reaction wall sub-section is linear. The second reaction wall includes at least two reaction wall sub-sections connected in sequence, wherein at least one reaction wall sub-section is arcuate and at least one reaction wall sub-section is linear, such as the embodiment shown in FIG. 9 below.

In an exemplary embodiment, the microfluidic flow channel structure further includes at least two mixing zones, and each mixing zone is connected with at least one division zone. Each said mixing zone includes a liquid inlet port, a mixing flow channel and a liquid outlet port. The liquid inlet ports of the at least two mixing zones are communicated with each other, and the liquid outlet port of each mixing zone is communicated with the opening in the first division wall of one division zone.

In an exemplary embodiment, the mixing flow channel is a serpentine channel, or may be of other channel shapes that facilitates mixing.

In an exemplary embodiment, the microfluidic flow channel structure further includes a liquid outlet zone, which includes one or more liquid outlet channels, and each liquid outlet channel is connected with the reaction zone. When the liquid outlet zone includes a plurality of liquid outlet channels, increasing the liquid outlet channels of the liquid outlet zone can achieve the effects of increasing the velocity gradient change, the direction change and enhancing the flow shear, as shown in the embodiment shown in FIG. 7 below.

The disclosed embodiment designs a microfluidic flow channel structure, which can better help antibody re-dissolution by increasing the flow velocity component in the reaction zone, increasing the flow disturbance and local shearing in the antibody embedded zone. On the one hand, it increases the redissolving speed of lyophilized antibody in the reaction zone, shortens the reaction time, and makes the chip more real-time; and increases the re-dissolving amount of lyophilized antibody samples, increases the accuracy and precision of detection, and increases the immune detection throughput. On the other hand, it reduces the amount of samples remaining in the reaction zone and improves the sample utilization.

FIG. 2 is a schematic diagram of a microfluidic flow channel structure according to the embodiment of the present disclosure. The microfluidic flow channel structure can be a cavity formed by a first substrate and a second substrate pair box, and is divided into a plurality of functional zones, as shown in FIG. 2. The microfluidic flow channel structure includes a liquid inlet zone 100, at least two mixing zones 200, a main chamber 300 and a liquid outlet zone 400, wherein the main chamber includes at least two division zones (310 and 330 as shown in FIG. 2) and a reaction zone 320. The liquid inlet zone 100, the mixing zone 200, the division zone 310, the reaction zone 320 and the liquid outlet zone 400 are connected in sequence, so that the sample liquid is fed from the liquid inlet zone 100, is mixed in the mixing zone 200, divided by the division zone 310, reacts in the reaction zone 320 and then flows out from the liquid outlet zone 400.

In this example, the liquid inlet zone 100 and the liquid outlet zone 400 are both linear channels, and the width of the channels ranges from 0.6 mm to 1.0 mm, for example, 0.8 mm. The length of the channels can be set as required. The liquid inlet zone 100 is connected with the inlet of the mixing zone 200, and the liquid inlet zone 100 may have a first liquid inlet port 101 and a first liquid outlet port 102.

Each mixing zone 200 includes a second liquid inlet port 201, a second liquid outlet port 202 and mixing flow channel, and each second liquid inlet port 202 is connected with the first liquid outlet port 102. In this example, the mixing flow channel is designed with multiple bends or called serpentine flow channel design, which is beneficial to effective mixing. In other embodiments, other flow channel structures which are beneficial to mixing can be used and are not limited herein. In order to simplify the structure, the width of the channel of the liquid inlet zone can be left unchanged, and a plurality of second liquid inlet ports 201 can be designed to communicate with each other. As shown in FIG. 2, the first liquid outlet port 202 is respectively connected with the two second liquid inlet ports 201 of the two mixing zones, the two second liquid inlet ports 201 are oppositely arranged, the first liquid outlet port is arranged in the vertical direction, and the three ports are arranged in a T-like shape. In this example, the first division of the sample liquid can be achieved by setting two mixing zones 200 to divide the incoming sample liquid into two ways (see the black arrow at the second liquid inlet port in the figure). The arrangement of the three ports can take other shapes, which is not limited herein, as long as the division can be realized. Although this embodiment takes two mixing zones as an example, it is known to those skilled in the art that in other embodiments, the mixing zones may be provided in a plurality.

The main chamber 300 includes at least two division zones 310 and a reaction zone 320 connected with the division zones 310, and the division zones 310 are connected with the mixing zones 200 in one-to-one correspondence. The main chamber 300 includes at least two third liquid inlet ports 301 and third liquid outlets 302, the third liquid inlet ports 301 are located in the division zone 310, each third liquid inlet ports 301 is connected with a second liquid outlet port 202, the third liquid outlet ports 302 are located in the reaction zone 320, and the third liquid outlet ports 302 are connected with the liquid outlet zone 400. In this example, the third liquid inlet ports 301 correspond to the second liquid outlet ports 202 one by one, and the division zones 310 correspond to the mixing zones 200 one by one (the number is the same). The sample liquid enters the division zone 310 through the third liquid inlet ports 301, and then enters the reaction zone 320 after diversion.

In this example, in order to ensure the direction and position of the sample liquid entering the division zone, the channel at the third liquid inlet ports 301 is designed in a bent structure, and each third liquid inlet ports 301 includes a first branch 3011 and a second branch 3012 which are connected with each other. The first branch 3011 is connected with the second branch 3012 in a bent way, which means that the first branch and the second branch have an angle greater than 0 degrees and less than 180 degrees between them (a in FIG. 2). One end of the first branch 3011 is connected to a second liquid outlet port 202 of a mixing zone 200, and the other end is connected to a second branch 3012, one end of which is connected to the first branch 3011, and the other end is connected to the division zone 310. Optionally, the extension direction of the second branch can be set to be 90+/−5 degrees from the direction of the side wall of the division zone connected with the second branch or the tangential direction of the side wall of the division zone (see ß in FIG. 3*a*).

In each division zone, the port of the third liquid inlet ports 301 is provided with a diversion structure 311, which diverts one way sample liquid entering from the third liquid inlet ports 301 into two ways, i.e., the second division of the sample liquid is realized through the diversion structure, and the sample liquid after two divisions is changed from one velocity component to four velocity components, which can enhance the flow shear and velocity disturbance, so that the lyophilized antibody can be better redissolved. In this example, the main chamber has two third liquid inlet ports 301, and the port of each third liquid inlet port is provided with a diversion structure 311, so that two ways of sample liquid entering the main chamber can be diverted into four ways (see the black arrow in the division zones in the figure), and four flow velocity components can be formed. When the microfluidic flow channel structure is symmetrical, the flow velocity components of each way may have the same velocity.

Figure 3A:
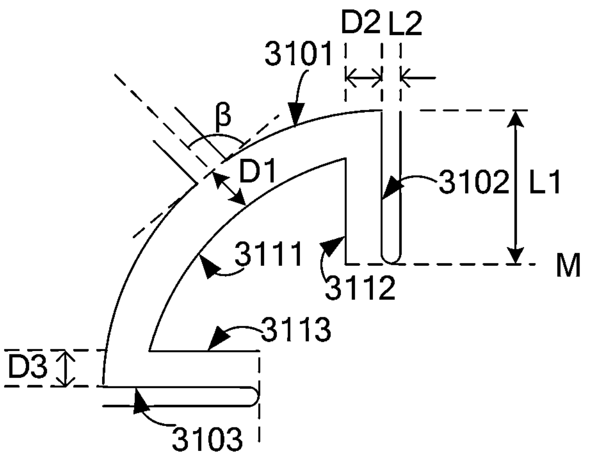
FIG. 3*a* is a schematic diagram of a division zone in the microfluidic flow channel structure shown in FIG. 2.

FIG. 3*a* illustrates the structure within the division zone with an example of a division zone 310. The structure of the division zone 330 is the same as that of the division zone 310. In this example, the division zone 310 includes a first division wall 3101, a second division wall 3102 connected to one end of the first division wall 3101, and a third division wall 3103 connected to the other end of the first division wall 3101, wherein the first division wall 3101 is arcuate. In this example, as shown in FIG. 3*a*, the second division wall 3102 and the third division wall 3103 are designed in a U-shaped structure, one end of which is connected to the first division wall 3101, and the other end of which is connected to the reaction wall (321 or 322) of the reaction zone. The first division wall 3101 is provided with an opening for liquid inlet (which is connected to the third liquid inlet port 301), and optionally, the opening may be provided in the middle of the first division wall 3101. In other embodiments, the second division wall 3102 and the third division wall 3103 may have other shapes, such as linear.

In the example shown in FIG. 2, two division zones are arranged adjacent to each other and can share a U-shaped structure division wall. As shown in FIG. 2, the side of U-shaped structure division wall 3103 near the first division zone 310 in the figure serves as the third division wall 3103 of the first division zone 310, and the side of U-shaped structure division wall 3103 near the second division zone 330 serves as the third division wall 3303 of the second division zone 330.

In this example, the diversion structure 311 includes a first diversion wall 3111, a second diversion wall 3112 connected to one end of the first diversion wall 3111, and a third diversion wall 3113 connected to the other end of the first diversion wall 3111, where the first diversion wall 3111 can be arcuate, similar to the first division wall 3101. For example, the radius of the first diversion wall 3111 can range from 2 mm to 6 mm, for example, 4 mm. In other embodiments, the first diversion wall may be linear or bending, and the second diversion wall 3112 and the third diversion wall 3113 are both linear. A first division channel (arc channel) is formed between the first diversion wall 3111 and the first division wall 3101, and the distance D1 between the first diversion wall 3111 and the first division wall 3101, i.e., the width of the first division channel, can be similar to the width of channels at other locations, with an average value ranging from 0.6 mm-1.0 mm, for example, 0.8 mm. The second diversion wall 3112 and the side of the second division wall 3102 near the second diversion wall 3112 form a second division channel, and the third diversion wall 3113 and the side of the third division wall 3103 near the third diversion wall 3113 form a third division channel. The first division channel is connected with the second division channel and the third division channel respectively. The distance D2 between the second diversion wall 3112 and the side of the second division wall 3102 near the second diversion wall 3112 (i.e., the width of the second division channel) may be the same as the distance D3 between the third diversion wall 3113 and the side of the third division wall 3103 near the third diversion wall 3113 (i.e., the width of the third division channel), and the values of D2 and D3 range from 0.6 mm to 1.0 mm, such as 0.8 mm.

Take a division zone shown in FIG. 3*a* as an example, one way sample liquid enters the division zone from the third liquid inlet port 301, and then forms two ways through the first division channel, one way sample liquid enters the reaction zone through the second division channel, and the other way sample liquid enters the reaction zone through the third division channel.

In an exemplary embodiment, the second division wall 3102 and the third division wall 3103 can be the side walls that reuse the main chamber, i.e., as shown in FIGS. 2 and 3*a*, the U-shaped second division wall 3102 and the third division wall 3103 are also part of the side walls of the main chamber 300. The extension direction of the U-shaped second division wall 3102 is the same as that of the second diversion wall 3112. The depth L1 of the U-shaped second division wall 3102 extending into the main chamber can range from 2.0 mm-2.8 mm, for example, 2.4 mm, and the opening distance L2 of the U-shaped structure can range from 0.2 mm-0.6 mm, for example, 0.4 mm. Optionally, the edge of the U-shaped second division wall 3102 extending into the main chamber is in the same plane (M in the figure) as the edge of the second diversion wall 3112 extending into the main chamber. Similarly, the extension direction of the U-shaped third division wall 3103 is the same as that of the third diversion wall 3113. The depth of the U-shaped third division wall 3103 extending into the main chamber can range from 2.0 mm to 2.8 mm, for example, 2.4 mm, and the opening distance of the U-shaped structure can range from 0.2 mm to 0.6 mm, for example, 0.4 mm. Optionally, the edge of the third division wall 3103 extending into the main chamber is in the same plane (N in the figure) as the edge of the third diversion wall 3113 extending into the main chamber.

Figure 3B:
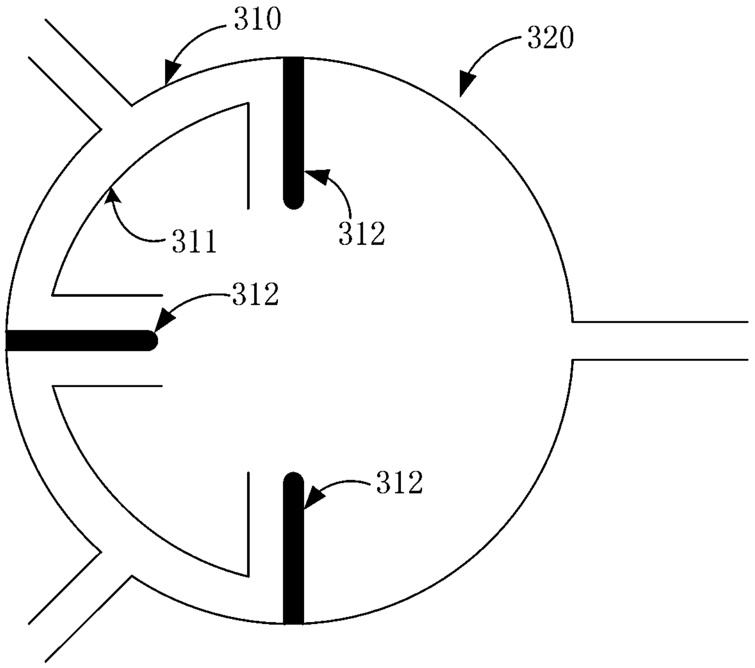
FIG. 3*b* is a schematic diagram of the main chamber in the microfluidic flow channel structure shown in FIG. 2.

In other embodiments, as shown in FIG. 3*b*, a convex structure 312 can be provided inside the main chamber, which can be used as the side wall of the division zone to provide a channel for the sample liquid.

In this embodiment, four-way liquid samples enter the reaction zone 320, and lyophilized antibodies are pre-embedded in the reaction zone 320. In an exemplary embodiment, the antibody can be lyophilized on the target carrier, placed in the reaction zone 320 of the first substrate, and then the second substrate and the first substrate are packaged to realize the pre-embedding of the antibody. By lyophilizing the embedded antibody to the target carrier in advance and encapsulating it in the reaction zone, the residue of antibody reagent on the detection chip can be effectively reduced, and the lyophilized antibody reagent can be prevented from being destroyed, compared with the method of direct lyophilization to the detection chip. The size of the target carrier can be, but not limited to, rectangular, and slightly smaller than the size of the reaction zone 320, so that the target carrier can be directly placed in the interlayer between the first substrate and the second substrate during encapsulation, the lyophilized first antibody will not be damaged, and the first antibody will not remain on the detection chip during redissolution.

In this example, the reaction zone 320 is designed as a semi-circular structure, and the distance between the first reaction wall and the second reaction wall, i.e., the width of the reaction channel, gradually decreases from the reaction zone inlet to the reaction zone outlet, which can provide reserved space and time for full reaction. The reaction zone 320 includes a first reaction wall 321 and a second reaction wall 322. The first reaction wall 321 and the second reaction wall 322 are opposite each other, forming a reaction zone inlet, a reaction channel and a reaction zone outlet. In this example, both the first reaction wall 321 and the second reaction wall 322 are arcuate. One end of the first reaction wall 321 is connected with one end of the second division wall 3102 of one division zone 310, the other end is connected with the first liquid outlet wall 401 of the liquid outlet zone, and one end of the second reaction wall 322 is connected with one end of the second division wall 3302 of another division zone (330 in the figure) and the other end is connected with the second liquid outlet wall 402 of the liquid outlet zone.

In this example, the first division walls 3101 of the two division zones both are arcuate, and the first reaction wall 321 and the second reaction wall 322 of the reaction zone are also arcuate. The main chamber composed of several arcs is circle-like, and the outer diameter of which can range from 7.8 mm to 11.6 mm, for example, 9.6 mm.

In this embodiment, the front end of the main chamber 300 has a double liquid inlet structure, and the rear end has an arcuate single liquid outlet structure. After passing through the liquid inlet zone, the sample liquid passes through two symmetrical mixing zones with multiple curved flow channels structures, and then enters two division zones from two inlets with bending structures respectively, and each way of sample liquid is divided into two, finally forming four velocity components to enter the reaction zone. In the reaction zone, four-way sample liquids react with the pre-embedded lyophilized antibody, and finally the reacted liquid flows out from the liquid outlet zone. Therefore, the microfluidic flow channel structure of this embodiment is a four-velocity component structure.

In this example, the thickness of the entire chip can range from 1.0 mm-1.4 mm, for example, 1.2 mm. The structure of the flow channel etched on the first substrate is shown in FIG. 2. The height of the entire flow channel can range from 0.2 mm-0.4 mm, for example, 0.3 mm, and the width of the flow channel such as the flow channel in the liquid inlet zone, the flow channel in the mixing zone, the flow channel in the division zone, and the flow channel in the liquid outlet zone, can range from 0.6 mm-1.0 mm, for example, 0.8 mm.

Figure 4A:
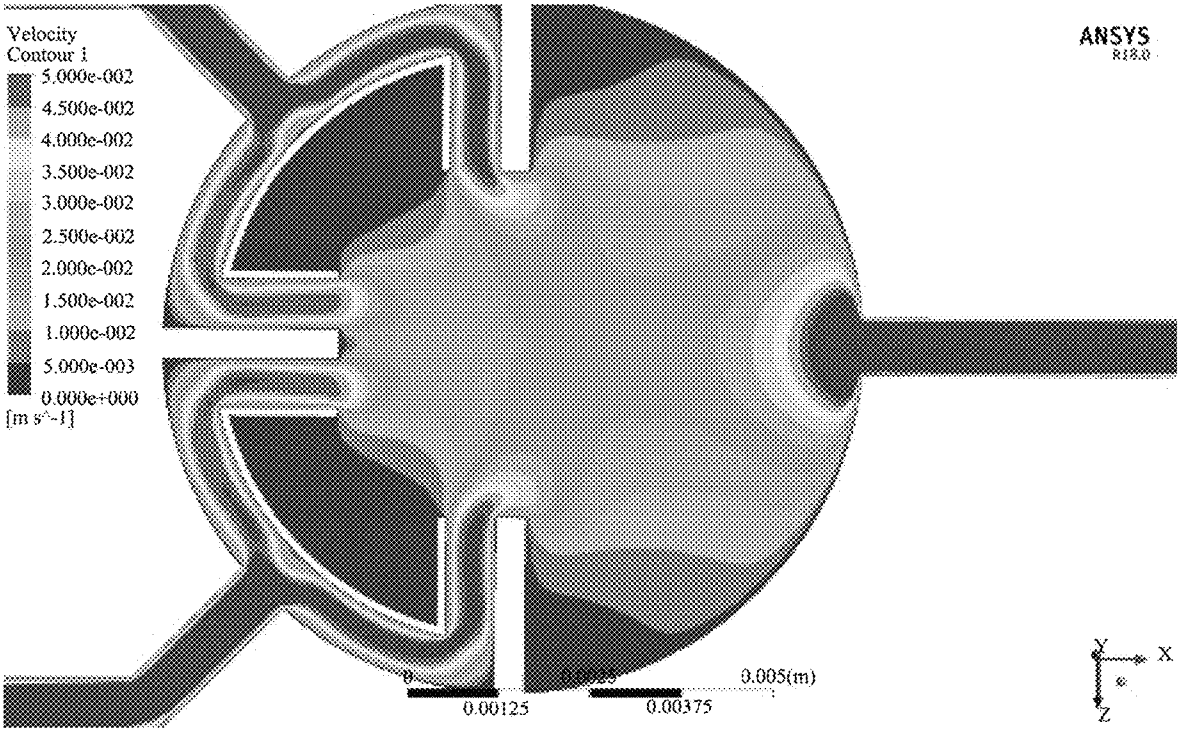
FIG. 4*a* is the simulation result of the flow velocity distribution in the main chamber of the flow channel structure shown in FIG. 2.
Figure 4B:
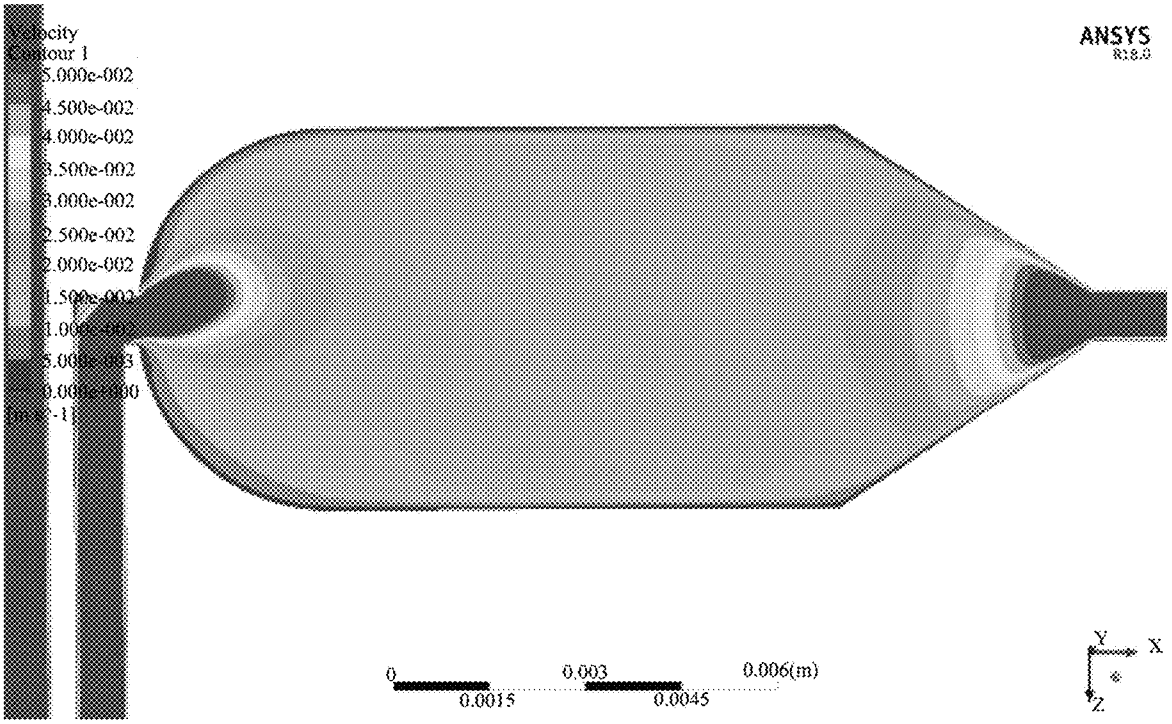
FIG. 4*b* is a simulation result of the velocity distribution of the related technology structure.
Figure 5A:
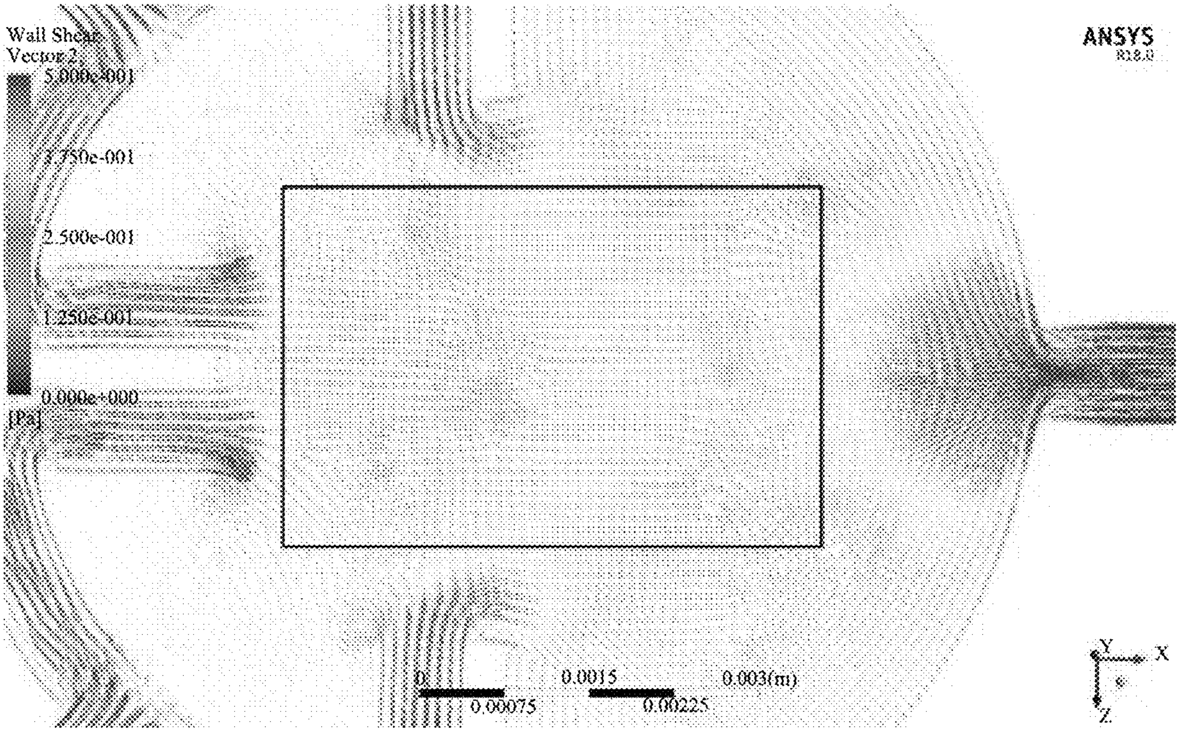
FIG. 5*a* is the simulation result of shear force distribution in the reaction zone of the main chamber of the flow channel structure shown in FIG. 2.
Figure 5B:
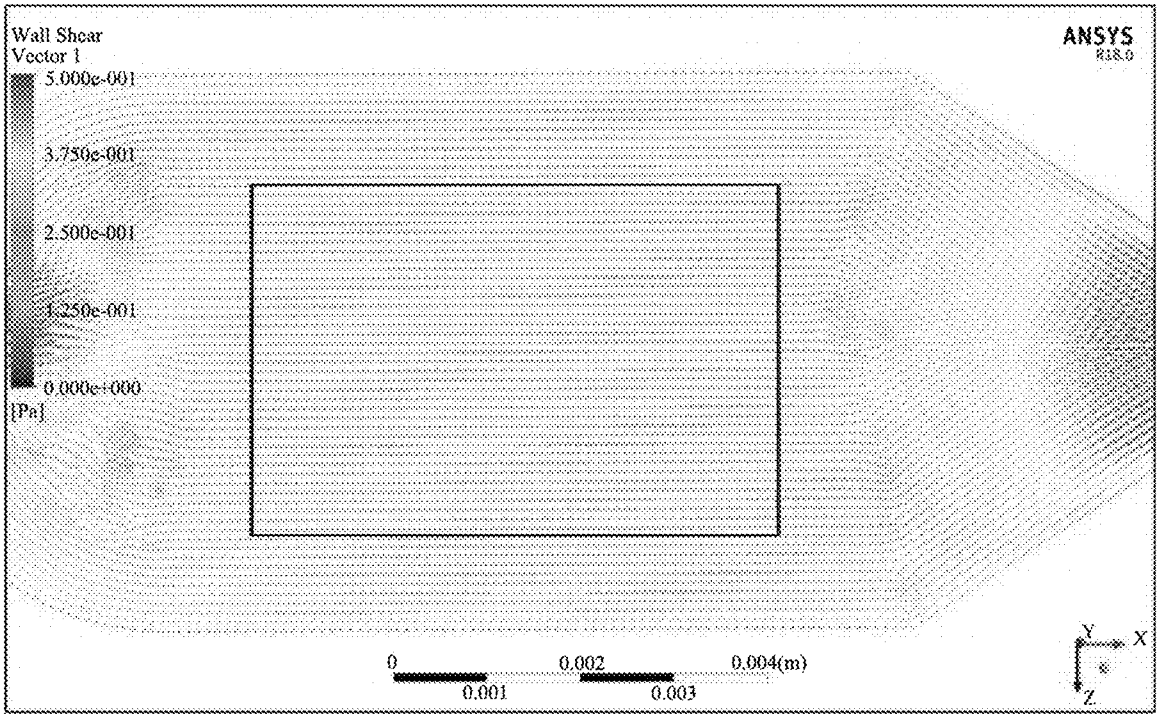
FIG. 5*b* is a simulation result of shear force distribution in the reaction zone of the related technology structure.

The actual effect of the structure shown in FIG. 2 is simulated and evaluated by the professional fluid simulation software Ansys Fluent, and compared with the structure adopted in the current project. The simulation results are shown in FIGS. 4 and 5. FIG. 4*a* shows the flow velocity distribution of the main chamber structure of this embodiment, and FIG. 4*b* shows the flow velocity distribution of the related technology structure. FIG. 5*a* shows the shear force distribution in the reaction zone of the main chamber structure of this embodiment, and FIG. 5*b* shows the shear force distribution in the reaction zone of the related technology structure. According to the simulation results, it can be seen that after division with the diversion structure, the reaction zone has greater velocity gradient change, direction change and stronger flow shear, which makes the lyophilized antibody better redissolve. The rectangular boxed portion in FIG. 5 is the pre-embedded zone of lyophilized antibody, i.e., the zone containing the aforementioned target carrier.

Figure 6:
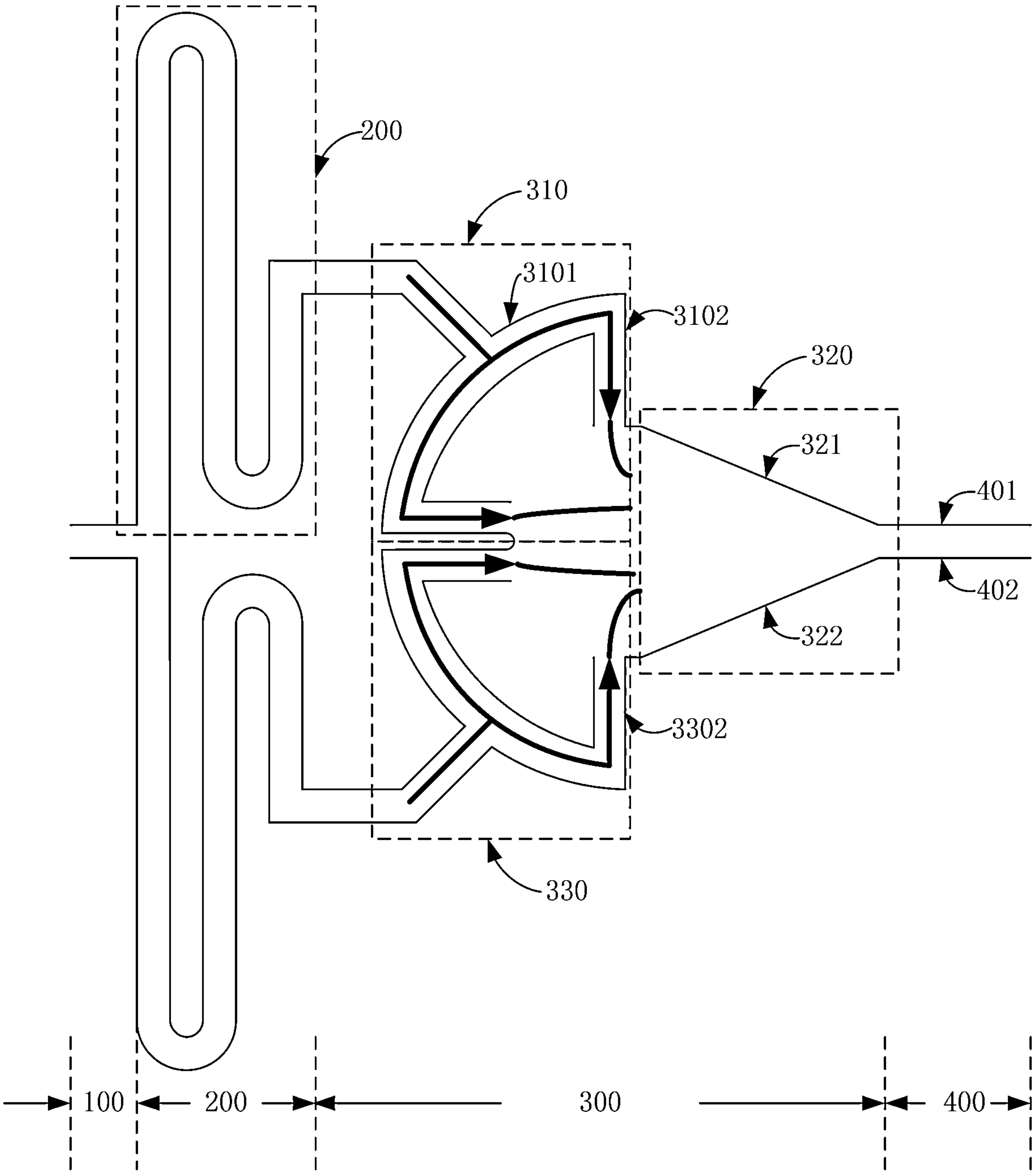
FIG. 6 is a schematic diagram of another microfluidic flow channel structure according to the embodiment of the present disclosure.

FIG. 6 is a schematic diagram of another microfluidic flow channel structure of the disclosed embodiment. Similar to the embodiment of FIG. 2, the microfluidic flow channel structure of this embodiment includes a liquid inlet zone 100, at least two mixing zones 200, a main chamber 300 and a liquid outlet zone 400, wherein the main chamber includes at least two division zones 310 and a reaction zone 320. The liquid inlet zone 100, the mixing zone 200, the division zone 310, the reaction zone 320 and the liquid outlet zone 400 are connected in sequence, so that the sample liquid is fed from the liquid inlet zone 100, is mixed in the mixing zone 200, divided by the division zone 310, reacts in the reaction zone 320 and then flows out from the liquid outlet zone 400. The microfluidic flow channel structure of this embodiment is still a four-velocity component structure.

Unlike the embodiment of FIG. 2, in this embodiment, the reaction zone 320 is designed as a conical structure, and the width of the reaction channel gradually decreases from the reaction zone inlet to the reaction zone outlet. The reaction zone 320 includes a first reaction wall 321 and a second reaction wall 322. In this example, both the first reaction wall 321 and the second reaction wall 322 are linear. One end of the first reaction wall 321 is connected with the end of the second division wall 3102 of one division zone 310 away from the first division wall 3101, and the other end is connected with the first liquid outlet wall 401 of the liquid outlet zone. One end of the second reaction wall 322 is connected with one end of the second division wall (3302 in the figure) of another division zone 330 which is away from the first division wall (3301 in the figure), and the other end is connected with the second liquid outlet wall 402 of the liquid outlet zone.

The wide front and narrow back reaction zone structure enables the lyophilized antibody pre-embedded on it to be subjected to greater impact and shearing, which helps to realize antibody redissolution and improve the reaction efficiency, thus improving the accuracy and precision of detection.

In this embodiment, the front end of the main chamber 300 has a double liquid inlet structure, and the rear end has a conical single liquid outlet structure. After passing through the liquid inlet zone, the sample liquid passes through two symmetrical mixing zones with multiple curved flow channels structure, and then enters two division zones from two inlets with bending structures respectively, and each way of sample liquid is divided into two, finally forming four velocity components to enter the conical reaction zone. The single-input and double-output structure of each division zone forms an inverted bifurcation structure in the whole, while the reaction zone of the conical structure exists exactly in the outlet region of the inverted bifurcation structure. This region will form a stronger vortex than the ordinary plane region from the structural and hydrodynamic principles, which can increase the local fluid disturbance, thus helping to improve the reaction efficiency at the structural level, and further improving the accuracy and precision of detection.

Figure 7:
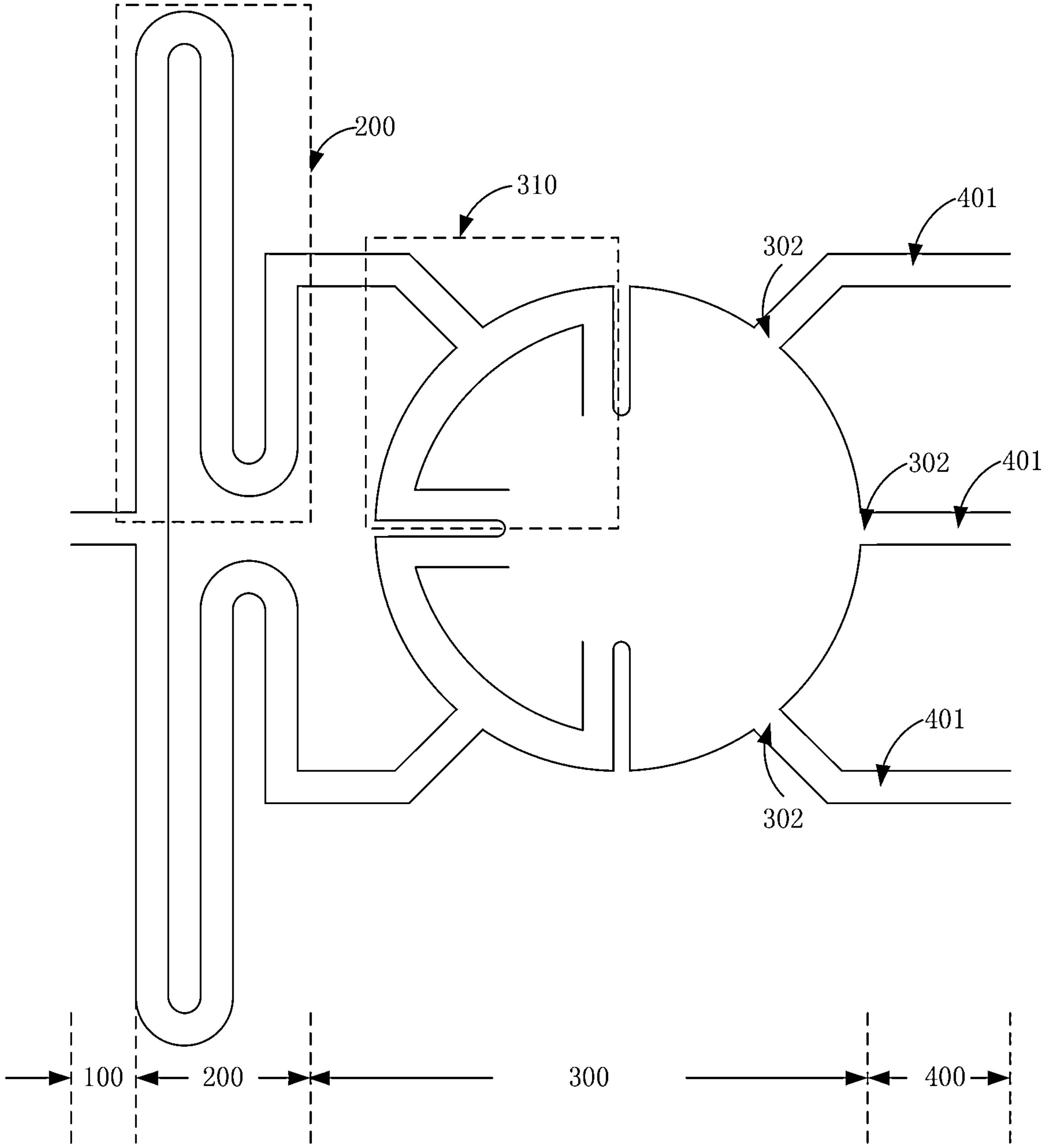
FIG. 7 is a schematic diagram of another microfluidic flow channel structure according to the embodiment of the present disclosure.

FIG. 7 is a schematic diagram of another microfluidic flow channel structure of the disclosed embodiment. Similar to the embodiment of FIG. 2, the microfluidic flow channel structure of this embodiment includes a liquid inlet zone 100, at least two mixing zones 200, a main chamber 300 and a liquid outlet zone 400, wherein the main chamber includes at least two division zones 310 and a reaction zone 320. The liquid inlet zone 100, the mixing zone 200, the division zone 310, the reaction zone 320 and the liquid outlet zone 400 are connected in sequence, so that the sample liquid is fed from the liquid inlet zone 100, is mixed in the mixing zone 200, divided by the division zone 310, reacts in the reaction zone 320 and then flows out from the liquid outlet zone 400. The microfluidic flow channel structure of this embodiment is still a four-velocity component structure.

Figure 8:
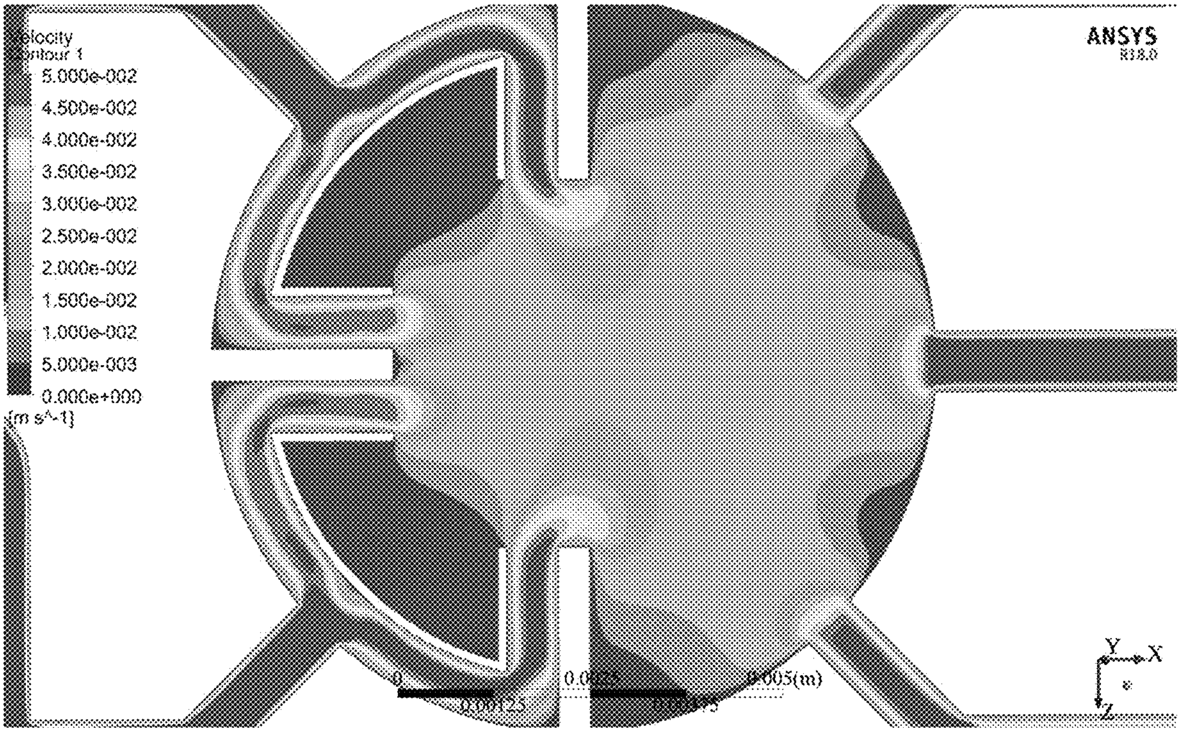
FIG. 8 is the simulation result of the flow velocity distribution in the main chamber of the channel structure shown in FIG. 7.

Unlike the embodiment shown in FIG. 2, in this embodiment, the main chamber 300 includes at least two third liquid outlet ports 302. As an example, in FIG. 7, a main chamber including three third outlet ports 302 is shown. Accordingly, the liquid outlet zone 400 includes at least two liquid outlet channels 401, and FIG. 7 shows the liquid outlet zone including three liquid outlet channels 401 as an example. Two symmetrical liquid outlet channels have been added, and the liquid in the three liquid outlet channels finally flows to the next reaction zone together. The purpose of adding the liquid outlet ports and the corresponding liquid outlet channel is to further change the flow field conditions in the reaction zone. By increasing the number of bifurcated division outlets, the velocity disturbance and flow field shear near the liquid outlet zone 400 are enhanced. The effect of this structure has been verified by simulation, as shown in FIG. 8.

Figure 9:
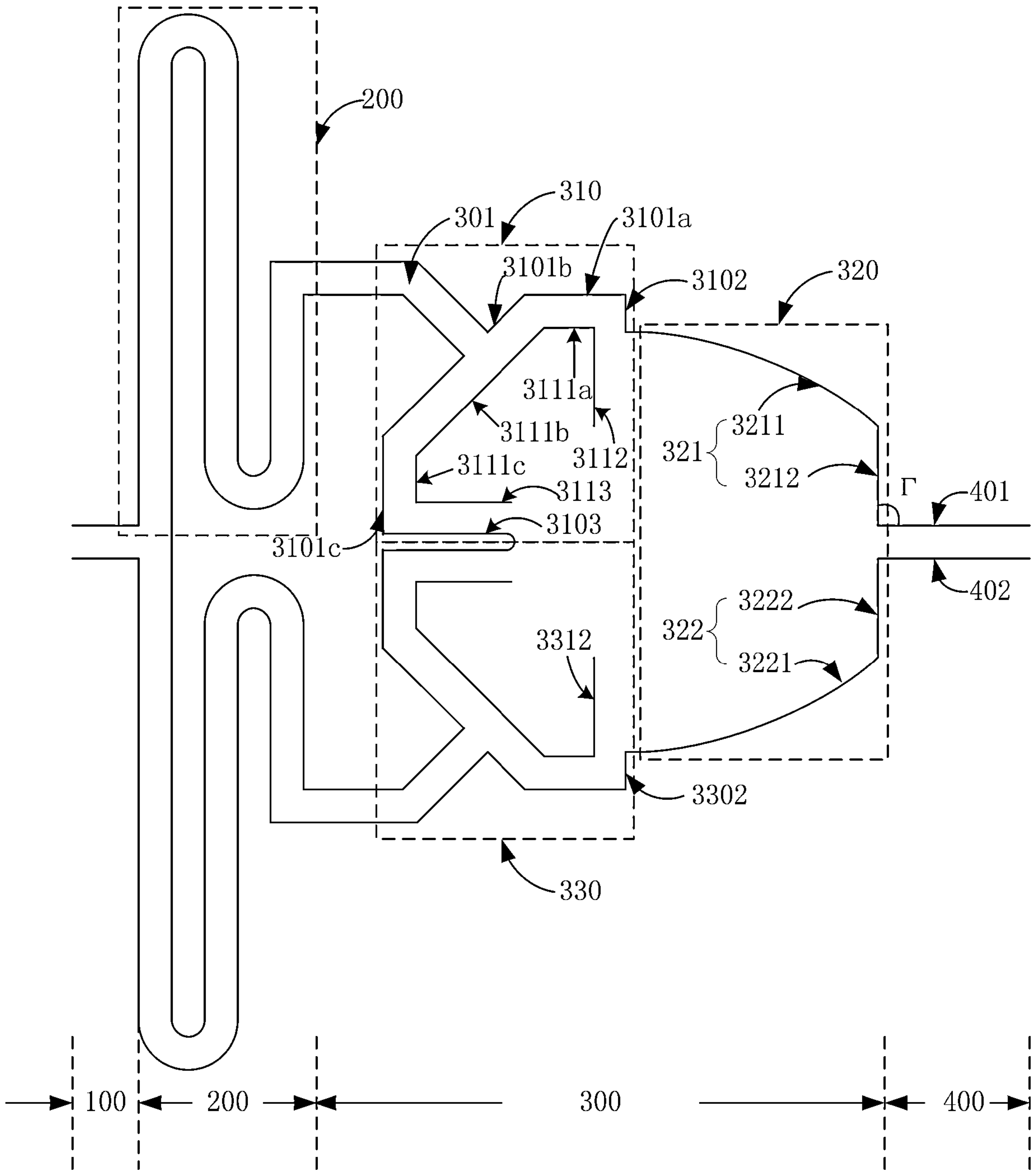
FIG. 9 is a schematic diagram of another microfluidic flow channel structure according to the embodiment of the present disclosure.

FIG. 9 is a schematic diagram of another microfluidic flow channel structure of the disclosed embodiment. Similar to the embodiment of FIG. 2, the microfluidic flow channel structure of this embodiment includes a liquid inlet zone 100, at least two mixing zones 200, a main chamber 300 and a liquid outlet zone 400, wherein the main chamber includes at least two division zones 310 and a reaction zone 320. The liquid inlet zone 100, the mixing zone 200, the division zone 310, the reaction zone 320 and the liquid outlet zone 400 are connected in sequence, so that the sample liquid is fed from the liquid inlet zone 100, is mixed in the mixing zone 200, divided by the division zone 310, reacts in the reaction zone 320 and then flows out from the liquid outlet zone 400. The microfluidic flow channel structure of this embodiment is still a four-velocity component structure.

Unlike the embodiment shown in FIG. 2, the first division wall 3101 in the division zone 310 is not an arcuate structure, but a bending structure, which includes three bending segments connected end to end: the first division bending segment 3101*a*, the second division bending segment 3101*b* and the third division bending segment 3101*c*, in which the bending segment the middle position (for example, the second bending segment 3101*b* in the figure) is provided with an opening for liquid inlet.

In this embodiment, the same as in the example of FIG. 2, two division zones share a U-shaped structure division wall at adjacent locations, except that the second division wall 3102 in the first division zone 310, which is away from the second division zone 330, is linear, and the length of the second division wall 3102 is shorter than that of the second diversion wall 3112 in the same division zone. Similarly, the second division wall (3302 in the figure) in the second division zone 330 away from the first division zone 310 is also linear, and the length of this second division wall (3302 in the figure) is less than the length of the second diversion wall (3312 in the figure) in the same division zone.

In this example, the first diversion wall 3111 in the diversion structure 311 is not arcuate, but a bending structure, including three bending segment connected end to end: the first division bending segment 3111*a*, the second division bending segment 3111*b* and the third division bending segment 3111*c*.

In this example, the fourth division channel is formed between the second division bending segment 301*b* and the second diversion bending segment 3111*b*, the fifth division channel is formed between the first division bending segment 3101*a* and the first diversion bending segment 3111*a*, and the sixth division channel is formed between the second division wall 3102 and the second diversion wall 3112. The fourth, fifth and sixth division channels are connected. Symmetrically, the seventh division channel is formed between the third division bending segment 3101*c* and the third diversion bending segment 3111*c*, the sixth division channel is formed between the second division wall 3102 and the second diversion wall 3112, the eighth division channel is formed between the third diversion wall 3113 and the third division wall 3103, and the fourth division channel, the seventh division channel and the eighth division channel are connected. As an illustration of one division zone as an example, one way sample liquid enters the division zone from the third liquid inlet ports 301, and then forms two ways through the fourth division channel. One way sample liquid enters the reaction zone through the fifth division channel and the sixth division channel, and the other way sample liquid enters the reaction zone through the seventh division channel and the eighth division channel.

In this embodiment, in one division zone, both the first division wall and the first diversion wall are both bending structure. In other embodiments, the first division wall and the first diversion wall of the same division zone can be of different shapes, for example, in one division zone, the first division wall is arcuate and the first diversion wall is bending, or in one division zone, the first division wall is bending and the first diversion wall is arcuate. In other embodiments, the designs of the two division zones located in the same main chamber may be different, for example, the first division wall and the first diversion wall in the first division zone are both in a bending structure, and the first division wall and the first diversion wall in the second division zone are both in an arcuate structure; Or the first division wall and the first diversion wall in the first division zone are in different shapes, and the first division wall and the first diversion wall in the second division zone are in the same shape; Or the first division wall and the first diversion wall in the first division zone are in the same shape, and the first division wall and the first diversion wall in the second division zone are in different shapes. Or in an exemplary embodiment, the first division zone is provided with a diversion structure, the second division zone is not provided with a diversion structure, or the first division zone is not provided with a diversion structure, and the second division zone is provided with a diversion structure. Not all of other arrangements and combinations of the above-mentioned structural designs of the division wall contours in the division zone and structural designs of the shape of the diversion structure have been exemplified. In an exemplary embodiment, it is not excluded that a diversion structure is provided in one division zone and no diversion structure is provided in another division zone.

In this embodiment, the reaction zone 320 is designed as a frustum-shaped structure. The reaction zone includes a first reaction wall 321 and a second reaction wall 322 which are opposite each other. The first reaction wall 321 includes a first reaction wall sub-section 3211 and a second reaction wall sub-section 3212 which are connected in sequence, wherein the first reaction wall sub-section 3211 is arcuate, the second reaction wall sub-section 3212 is linear, and the second reaction wall 322 includes a third reaction wall sub-section 3221 and a fourth reaction wall sub-section 3222 which are connected in sequence, wherein the third reaction wall sub-section 3221 is arcuate and the second reaction wall sub-section 3222 is linear. The first reaction wall sub-section 3211 and the third reaction wall sub-section 3221 are opposite each other, and the second reaction wall sub-section 3212 and the fourth reaction wall sub-section 3222 are opposite each other. The reaction zone formed by the first reaction wall 321 and the second reaction wall 322 has a frustum-shape. In this example, the second reaction wall sub-section 3212 and the fourth reaction wall sub-section 3222 extend in the same direction, the second reaction wall sub-section 3212 is connected vertically to the first liquid outlet wall 401, and the fourth reaction wall sub-section 3222 is connected vertically to the second liquid outlet wall 402. In other embodiments, the angle γ between the second reaction wall sub-section 3212 and the first liquid outlet wall 401 may range from more than 90 degrees to less than 180 degrees. The width of the reaction channel gradually decreases from the reaction zone inlet to the reaction zone outlet. The reaction zone 320 includes a first reaction wall 321 and a second reaction wall 322. In this example, both the first reaction wall 321 and the second reaction wall 322 are arcuate, and one end of the first reaction wall 321 is connected with the end of the second division wall 3102 of one division zone 310 away from the first division wall 3101 (in the figure, the end of the first division bending segment 3101*a* away from the second division bending segment 301*b*), the other end is connected to the first liquid outlet wall 401 of the liquid outlet zone. One end of the second reaction wall 322 is connected to the end of the second division wall 3102 of another division zone 330 away from the first division wall 3101, and the other end is connected to the second liquid outlet wall 402 of the liquid outlet zone.

In this embodiment, the front end of the main chamber 300 has a double liquid inlet structure, and the rear end has an arcuate single liquid outlet structure. After passing through the liquid inlet zone, the sample liquid passes through two symmetrical mixing zones with multiple curved flow channel structures, and then enters into two division zones from two inlets with bending structures respectively. Each way of sample liquid is divided into two, and finally four velocity components are formed. It can be seen that the microfluidic flow channel structure of this embodiment is still a four-velocity component structure. In this example, a linear division structure is used for the division zone, and a frustum-shaped structure is used for the reaction zone with an arcuate shape as the zone contour, which can reduce the area of the flow stagnation zone and the "dead volume" with low flow rate caused by the inwardly extending channel structure of the arcuate shape contour (for example, the areas above and below the arcuate shape reaction zone in FIG. 4*a*) and improve the sample utilization.

FIG. 10 is a schematic diagram of another microfluidic flow channel structure of the embodiment of the present disclosure. Similar to the embodiment of FIG. 2, the microfluidic flow channel structure of this embodiment includes a liquid inlet zone 100, at least two mixing zones 200, a main chamber 300 and a liquid outlet zone 400, wherein the main chamber includes at least two division zones 310 and a reaction zone 320. The liquid inlet zone 100, the mixing zone 200, the division zone 310, the reaction zone 320 and the liquid outlet zone 400 are connected in sequence, so that the sample liquid is fed from the liquid inlet zone 100, is mixed in the mixing zone 200, divided by the division zone 310, reacts in the reaction zone 320 and then flows out from the liquid outlet zone 400.

Unlike the embodiment of FIG. 2, in this embodiment, two adjacent division zones share a division channel, i.e., the microfluidic flow channel structure of this embodiment is a three-velocity component structure.

Unlike the embodiment of FIG. 2, there is no third division wall 3103 in this embodiment. The first division zone 310 includes a first division wall 3101 and a second division wall 3102 connected with one end of the first division wall 3101, wherein the first division wall 3101 is arcuate, and in this embodiment, the second division wall 3102 is designed as a U-shaped structure, with one end of which connected to the first division wall 3102 and the other end used to connect to the reaction wall of the reaction zone. The first diversion structure 311 in the first division zone 310 includes a first diversion wall 3111, a second diversion wall 3112 and a third diversion wall 3113, wherein the first diversion wall 3111 is opposite the first division wall 3101 to form a first division channel, and the second diversion wall 3112 is opposite the second division wall 3102 to form a second division channel. The second division zone 330 includes a first division wall (3301 in the figure) and a second division wall (3302 in the figure) connected with one end of the first division wall (3301 in the figure), wherein the first division wall (3301 in the figure) is arcuate, and in this embodiment, the second division wall (3302 in the figure) is designed as a U-shaped structure, with one end of the U-shaped structure connected to the first division wall (3301 in the figure) and the other end used to connect to the reaction wall of the reaction zone. The first diversion structure (331 in the figure) in the second division zone 330 includes a first diversion wall (3311 in the figure), a second diversion wall (3312 in the figure) and a third diversion wall (3313 in the figure), wherein the first diversion wall (3311 in the figure) is opposite the first division wall (3301 in the figure) to form a first division channel and the second diversion wall (3312 in the figure) is opposite the second diversion wall (3302 in the figure) to form a second division channel. The first division wall 3101 of the first division zone is connected with the first division wall (3301 in the figure) of the second division zone, and a third division channel is formed between the third diversion wall 3113 of the first division zone and the third diversion wall (3313 in the figure) of the second division zone, which is connected with the first division channel of the first division zone and the second division channel of the second division zone, respectively, so that two adjacent division zones share one division channel. In the example shown in FIG. 10, the first division wall 3101 of the first division zone 310 is connected with the first division wall 3301 of the second division zone 330, and the division walls 3101 and 3301 form an integral structure. For example, one end of the first division wall 3101 of the first division zone 310 away from the second division wall 3102 of the first division zone is connected with one end of the first division wall 3301 of the second division zone 330 away from the second division wall 3302 of the second division zone.

The first division wall (3101 and 3301) in each division zone is provided with an opening for liquid inlet, and optionally, the opening can be arranged in the middle of the first division wall.

FIG. 11 is a schematic diagram of another microfluidic flow channel structure of the disclosed embodiment. Similar to the embodiment of FIG. 10, the microfluidic flow channel structure of this embodiment includes a liquid inlet zone 100, at least two mixing zones 200, a main chamber 300 and a liquid outlet zone 400, wherein the main chamber includes at least two division zones 310 and a reaction zone 320. The liquid inlet zone 100, the mixing zone 200, the division zone 310, the reaction zone 320 and the liquid outlet zone 400 are connected in sequence, so that the sample liquid is fed from the liquid inlet zone 100, is mixed in the mixing zone 200, divided by the division zone 310, reacts in the reaction zone 320 and then flows out from the liquid outlet zone 400.

Unlike the embodiment of FIG. 10, in this embodiment, taking the first division zone as an example, an opening is formed in the second division wall 3102 of the U-shaped structure in the division zone, which can increase one way velocity component. Similarly, the opening in the second division wall of the U-shaped structure of the second division zone can increase one way velocity component, so the microfluidic flow channel structure of this embodiment is a five-velocity component structure.

In this embodiment, both the first division zone and the second division zone are provided with openings. In other embodiments, the openings may be provided in the second division wall of only one division zone. In addition, the possibility of providing openings in other division walls is not excluded in addition to the second division wall.

FIG. 12 is a schematic diagram of another microfluidic flow channel structure of the disclosed embodiment. Similar to the embodiment of FIG. 11, the microfluidic flow channel structure of this embodiment includes a liquid inlet zone 100, at least two mixing zones 200, a main chamber 300 and a liquid outlet zone 400, wherein the main chamber includes at least two division zones 310 and a reaction zone 320. The liquid inlet zone 100, the mixing zone 200, the division zone 310, the reaction zone 320 and the liquid outlet zone 400 are connected in sequence, so that the sample liquid is fed from the liquid inlet zone 100, is mixed in the mixing zone 200, divided by the division zone 310, reacts in the reaction zone 320 and then flows out from the liquid outlet zone 400.

As in the embodiment of FIG. 11, the second division wall of the U-shaped structure in the division zone is provided with an opening to increase one way velocity component. Unlike the embodiment of FIG. 11, the two division zones do not share the division channel, i.e., the scheme that the two division zones share the U-shaped structure division wall in the embodiment of FIG. 2 is used. The microfluidic flow channel structure of this embodiment is a six-velocity component structure, i.e., the sample liquid has six velocity components in the division zone.

To sum up, the above-mentioned design of the flow channel structure of microfluidic chip can achieve the effect of enhancing the redissolution of lyophilized antibody, facilitate the reaction and detection of double antibody sandwich immune chip, reduce the reaction time and improve the detection accuracy.

The embodiments herein can be combined with each other without conflict. Taking the division zone as an example, for example, the division zone structure shown in FIG. 2 can be combined with the reaction zone structure shown in the embodiment of FIG. 9 to form a main chamber; or the division zone structure shown in FIG. 9 can be combined with the reaction zone structure shown in FIG. 2 or the reaction zone structure shown in FIG. 6 as the main chamber; or the division zone structure shown in FIG. 10 can be combined with the reaction zone structure shown in FIG. 6 or the reaction zone structure shown in FIG. 9 as the main chamber. Alternatively, the division zone structure shown in FIG. 11 can be combined with the reaction zone structure shown in FIG. 6 or the reaction zone structure shown in FIG. 9 as the main chamber; or the division zone structure shown in FIG. 12 can be combined with the reaction zone structure shown in FIG. 6 or the reaction zone structure shown in FIG. 9 as the main chamber. In an exemplary embodiment, the aforementioned various main chamber structures can be combined with the liquid zone structure shown in FIG. 7, respectively. Other arrangement and combination forms of internal design and external contour structure design of the division zone, reaction zone and liquid outlet zone in the above-mentioned flow channel design are not fully listed.

The disclosed embodiment also provides a microfluidic chip including the microfluidic flow channel structure described in any of the above embodiments. There may be other flow channel structures in the microfluidic chip, which is not limited herein.

Taking the micro-flow channel structure of the embodiment of the present disclosure as an example to realize the double-antibody fluorescent immune sandwich method, in a simplified manner, it is assumed that the antigen P to be tested has two antigenic determinants A and B, and two corresponding antibodies a and b can be specifically combined with them. Arbitrarily or selectively, a can be immobilized on the surface of the chip detection zone (the inner surface of the main chamber reaction zone of the microfluidic flow channel structure) chemically or physically, and then the sample containing the antigen P to be tested flows through the detection zone. Part of P will be captured by a and immobilized. Next, the fluorescently labeled antibody b is introduced into the chip, and the antibody b can also be combined with P. The immobilized P can continue to capture antibody b, and finally, it will be cleaned (the captured antigen and antibody will not be washed off), so that by fluorescence detection, if fluorescence is found, it means that the sample contains P. Due to the design of the microfluidic flow channel structure of the disclosed embodiment, the sample liquid in the main chamber has greater velocity gradient change, direction change and stronger flow shear, so that the lyophilized antibody can be redissolved better, the redissolving speed of the lyophilized antibody in the reaction zone is improved, the instantaneity of the microfluidic chip is improved, the redissolving amount of the lyophilized antibody sample is increased, the accuracy and precision of the detection result are improved, and the immunoassay throughput is improved; and the amount of samples stagnation in the reaction zone is reduced to improve the antigen-antibody reaction efficiency in the fluorescent immune chip, improve the samples utilization, and improve the accuracy and effectiveness of detection.

It should be noted that the structure shape and size proportion of the microfluidic flow channel structure described in the embodiments of the present disclosure are not limited to those described in the above embodiments, and can be adjusted according to actual requirements, and the embodiments of the present disclosure are not limited in this regard. In addition, the drawings of this disclosure are only used to schematically illustrate the structure shape and approximate proportion, and do not limit the size and proportion of the microfluidic flow channel structure of this embodiment.

In the description of the embodiments of the present disclosure, it should be understood that an orientation or a positional relation indicated by the terms “middle”, “upper”, “lower”, “front”, “rear”, “vertical”, “horizontal”, “top”, “bottom”, “inner”, “outer” and the like is based on the orientation or the positional relation shown in the accompanying drawings, which is only for the convenience of describing the present disclosure and simplifying the description, rather than indicating or implying that the device or the element referred to must have the specific orientation, or be constructed and operated in the specific orientation, and thus cannot be interpreted as a limitation on the present disclosure.

In the description of the embodiment of the present disclosure, it should be noted that unless otherwise specified and limited, the terms “mount”, “connected” and “connect” should be understood in a broad sense. For example, a connection may be fixed connection, detachable connection or integrated connection, may be mechanical connection or electrical connection, or may be direct connection, indirect connection through intermediate medium, or communication inside two components. Those of ordinary skills in the art may understand meanings of the above-mentioned terms in the present disclosure according to situations.

In the present disclosure, “about” refers to that a boundary is defined not so strictly and numerical values within process and measurement error ranges are allowed.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A microfluidic flow channel structure, comprising a main chamber, the main chamber comprises at least two division zones and a reaction zone, and the at least two division zones are respectively connected with the reaction zone, wherein:

a division zone of the at least two division zones comprises a first division wall, and the first division wall is provided with an opening for liquid inlet;

a diversion structure is arranged at the opening of the division zone of the at least two division zones, and the diversion structure at least comprises a first diversion wall, which is arranged opposite the first division wall;

a first division channel is formed between the first diversion wall and the first division wall;

the opening serves as a liquid inlet of the first division channel, and the first division channel comprises at least two liquid outlets;

each division zone is in a single-input and double-output structure;

the at least two division zones are adjacent to form four liquid paths for sample liquid to enter the reaction zone;

the reaction zone is a conical reaction zone, and the conical reaction zone is in an outlet region of the single-input and double-output structure; and the microfluidic flow channel structure further comprises a liquid outlet zone, and the liquid outlet zone comprises a plurality of liquid outlet channels, and each liquid outlet channel is connected with the reaction zone.

2. The microfluidic flow channel structure according to claim 1, wherein the division zone of the at least two division zones further comprises a second division wall, one end of the first division wall is connected with the second division wall, the diversion structure further comprises a second diversion wall, one end of the first diversion wall is connected with the second diversion wall, the second diversion wall is arranged opposite the second division wall, a second division channel is formed between the second diversion wall and the second division wall, and the second division channel is communicated with the first division channel.

3. The microfluidic flow channel structure according to claim 2, wherein the division zone of the at least two division zones further comprises a third division wall, one end of the first division wall away from the second division wall is connected with the third division wall, the diversion structure further comprises a third diversion wall, one end of the first diversion wall away from the second diversion wall is connected with the third diversion wall, the third diversion wall is arranged opposite the third division wall, and a third division channel is formed between the third diversion wall and the third division wall; and the third division channel is communicated with the first division channel.

4. The microfluidic flow channel structure according to claim 3, wherein for any two adjacent division zones, the third diversion wall of the first division zone and the third diversion wall of the second division zone share a division wall structure, and a side of the division wall structure facing the first division zone serves as the third division wall of the first division zone, and a side of the division wall structure away from the first division zone serves as the third division wall of the second division zone.

5. The microfluidic flow channel structure according to claim 4, wherein, in a plane parallel to the microfluidic flow channel structure, the third division wall is arcuate or linear and the third diversion wall is arcuate or linear.

6. The microfluidic flow channel structure according to claim 4, wherein the division wall structure has a U-shaped cross section in a plane parallel to the microfluidic flow channel structure.

7. The microfluidic flow channel structure according to claim 3, wherein, in a plane parallel to the microfluidic flow channel structure, the third division wall is arcuate or linear and the third diversion wall is arcuate or linear.

8. The microfluidic flow channel structure according to claim 3, wherein in a plane parallel to the microfluidic flow channel structure, the second division wall is arcuate or linear and the second diversion wall is arcuate or linear.

9. The microfluidic flow channel structure according to claim 2, wherein for any two adjacent division zones, one end of the first division wall of the first division zone is connected with one end of the first division wall of the second division zone, the other end of the first division wall of the first division zone is connected with the second division wall of the second division zone, and the other end of the first division wall of the second division zone is connected with the second division wall of the second division zone;

the division zone of the at least two division zones further comprise a third diversion wall, and one end of the first diversion wall away from the second diversion wall is connected with the third diversion wall; and a third division channel is formed between the third diversion wall of the first division zone and the third diversion wall of the second division zone, and the third division channel is communicated with the first division channel of the first division zone and the first division channel of the second division zone.

10. The microfluidic flow channel structure according to claim 2, wherein in a plane parallel to the microfluidic flow channel structure, the second division wall is arcuate or linear and the second diversion wall is arcuate or linear.

11. The microfluidic flow channel structure according to claim 2, wherein the second division wall has a U-shaped cross section in a plane parallel to the microfluidic flow channel structure.

12. The microfluidic flow channel structure according to claim 2, wherein the second division wall is provided with an opening.

13. The microfluidic flow channel structure according to claim 2, wherein in a plane parallel to the microfluidic flow channel structure, the first division wall is arcuate, linear or bending, and the first diversion wall is arcuate, linear or bending.

14. The microfluidic flow channel structure according to claim 1, wherein in a plane parallel to the microfluidic flow channel structure, the first division wall is arcuate, linear or bending, and the first diversion wall is arcuate, linear or bending.

15. The microfluidic flow channel structure according to claim 1, wherein the reaction zone comprises a first reaction wall and a second reaction wall, wherein the first reaction wall and the second reaction wall are oppositely arranged to form a reaction zone inlet, a reaction channel and a reaction zone outlet, and the width of the reaction zone channel gradually decreases from the reaction zone inlet to the reaction zone outlet.

16. The microfluidic flow channel structure according to claim 15, wherein in the plane parallel to the microfluidic flow channel structure, the first reaction wall and the second reaction wall are arcuate; or the first reaction wall and the second reaction wall are linear or bending; or the first reaction wall comprises at least two reaction wall sub-sections connected in sequence, wherein at least one reaction wall sub-section is arcuate and at least one reaction wall sub-section is linear; the second reaction wall comprises at least two reaction wall sub-sections connected in sequence, wherein at least one reaction wall sub-section is arcuate and at least one reaction wall sub-section is linear.

17. The microfluidic flow channel structure according to claim 1, further comprising, at least two mixing zones, each mixing zone is connected with at least one division zone;

each said mixing zone comprises a liquid inlet port, a mixing flow channel and a liquid outlet port; and the liquid inlet ports of the at least two mixing zones are communicated, and the liquid outlet port of each mixing zone is communicated with the opening in the first division wall of one division zone.

18. The microfluidic flow channel structure according to claim 17, wherein, the mixing flow channel is a serpentine channel.

19. A microfluidic chip comprising the microfluidic flow channel structure according to claim 1.

* * * * *